United States Patent
Du et al.

(10) Patent No.: US 9,283,698 B2
(45) Date of Patent: Mar. 15, 2016

(54) SYSTEM AND METHOD FOR PREVENTING WARPAGE OF METAL COMPONENTS DURING MANUFACTURING PROCESSES

(75) Inventors: Shouzhong (Alex) Du, Singapore (SG); Richard Dale Michonski, Marengo, IL (US); Dongji Xie, San Jose, CA (US); Jichen (Jeff) Qin, Guang Zhou (CN)

(73) Assignee: Flextronics AP, LLC, Broomfield, CO (US)

( * ) Notice: Subject to any disclaimer, the term of this patent is extended or adjusted under 35 U.S.C. 154(b) by 1092 days.

(21) Appl. No.: 13/077,433

(22) Filed: Mar. 31, 2011

(65) Prior Publication Data

US 2011/0239725 A1    Oct. 6, 2011

Related U.S. Application Data

(60) Provisional application No. 61/320,006, filed on Apr. 1, 2010.

(51) Int. Cl.
*B29C 45/14* (2006.01)
*B29C 45/72* (2006.01)
*B29K 705/00* (2006.01)

(52) U.S. Cl.
CPC ............. *B29C 45/14* (2013.01); *B29C 45/7207* (2013.01); *B29K 2705/00* (2013.01); *Y10T 29/49* (2015.01)

(58) Field of Classification Search
CPC ............................ B29C 45/14; B29C 45/7207
USPC ......................................................... 148/522
See application file for complete search history.

(56) References Cited

U.S. PATENT DOCUMENTS

| | | | | |
|---|---|---|---|---|
| 2,893,083 | A | * | 7/1959 | Ladd ................................ 164/75 |
| 5,139,407 | A | * | 8/1992 | Kim et al. .............. 425/174.8 E |
| 5,799,860 | A | * | 9/1998 | Demaray et al. ............. 228/194 |
| 2011/0008644 | A1 | * | 1/2011 | Naritomi et al. .............. 428/612 |

* cited by examiner

*Primary Examiner* — Jie Yang
(74) *Attorney, Agent, or Firm* — Haverstock & Owens LLP

(57) ABSTRACT

A method for manufacturing a component including a bi-metallic sheet includes performing a manufacturing process that heats the bi-metallic sheet and physically constraining the bi-metallic sheet from deformation during the cooling of the bi-metallic sheet. Optionally, the method additionally includes physically constraining the bi-metallic sheet from deformation during the manufacturing process that heats the bi-metallic sheet. A constraining apparatus is also disclosed and includes a first constraining component having a first thermally conductive contact surface adapted to abut a first surface of a metal sheet, a second constraining component having a second contact surface adapted to abut a second surface of the metal sheet, and an engaging device operative to fix the first constraining component and the second constraining component in position relative to one another. The metal sheet is constrained between the first contact surface and the second contact surface during heating and/or cooling.

19 Claims, 11 Drawing Sheets

SYSTEM AND METHOD FOR PREVENTING WARPAGE OF METAL COMPONENTS DURING MANUFACTURING PROCESSES

RELATED APPLICATIONS

This application claims the benefit of priority to U.S. Provisional Patent Application Ser. No. 61/320,006, filed Apr. 1, 2010 by the same inventors and entitled "System And Method For Preventing Warpage Of Metal Components During Manufacturing Processes," which is incorporated by reference herein in its entirety.

BACKGROUND OF THE INVENTION

1. Field of the Invention

This invention relates generally to the manufacturing of enclosures (e.g., housings, battery covers, etc.) for electronic devices, and more particularly to the manufacturing of metal enclosures for 3C (computers, communications, consumer electronics) devices. Even more particularly, the present invention relates to preventing a bimetallic enclosure from experiencing warp deformation when heated by a manufacturing process, for example an NMT (Nano Mold Technology) process.

2. Description of the Background Art

Currently, the demand for 3C products is becoming increasingly more dependent on aesthetics. As a result, more and more eye-catching effects and differentiating characteristics are being incorporated into the enclosure design of such products. For example, metal housings are the current trend in the 3C market.

Applicants have discovered that there are advantages to forming metal housings from bimetallic metal. One example of bimetallic material is sheet metal that is formed by cold rolling two sheets of different metals together to form a single two-ply sheet. As used herein, the term bimetallic is considered to also include materials having more than two layers formed of two or more different metals.

Although advantages exist, there are some problems that must be addressed in order to increase product yield. For example, bimetallic sheet metal is prone to warp when subjected to significant temperature changes, because the two metals have a different coefficients of thermal expansion (CTEs). As a result, bimetallic components are particularly vulnerable during manufacturing processes in which the shell is exposed to heating. For example, bimetallic shells can experience serious warp deformation after being released from an NMT mold and allowed to cool at room temperature.

What is needed, therefore, is a means for preventing warpage of bimetallic components during manufacturing. What is also needed is a means for preventing warpage of bimetallic components subjected to manufacturing processes involving heat. What is also needed is a means for preventing warpage of bimetallic components that are involved in molding processes. What is also needed is a means for improving the product quality and yield of manufacturing processes involving bimetallic components.

SUMMARY

The present invention overcomes problems that occur when bimetallic parts are exposed to temperature fluctuations, by providing system and method for constraining parts as they are cooled. A first solution utilizes a cooling fixture to constrain the molded product once it has been released from the mold. The part or assembly is placed in the fixture while still warm and allowed to cool in the fixture fully constrained. A second solution uses a rapid heating and cooling method (RHCM) to rapidly heat and cool the product in the mold. Because the product has been heated and cooled under the full constraint of the mold, the deformation will be dramatically reduced.

The process time of the second solution is substantially less than the process time of the first solution. However, both solutions use similar principles and provide significant improvements in quality and yield as compared to the prior art. Both solutions provide physical constraint during the heating up and/or cooling down process to prevent the free deformation of the bi-metallic product. This allows the stress distribution to reach a new balanced state under physical constraint. Although full constraint provides exceptional results, the amount of constraint required may vary depending on the specific details of a particular application.

An example method for manufacturing a component including a bi-metallic sheet is disclosed. The bi-metallic sheet includes a first layer of a first metal and a second layer of a second metal. The second metal is different than the first metal and has a different coefficient of thermal expansion. The method includes performing a manufacturing process that results in the heating of the bi-metallic sheet, cooling the bi-metallic sheet, and physically constraining the bi-metallic sheet from deformation during the step of cooling the bi-metallic sheet. Optionally, the method additionally includes physically constraining the bi-metallic sheet from deformation during the manufacturing process that results in the heating of the bi-metallic sheet.

In an example method, the step of performing a manufacturing process that results in the heating of the bi-metallic sheet includes performing a molding process. The example molding process includes molding a structure directly on a surface of the bi-metallic sheet, for example as in an NMT process. In this example method, the step of constraining the bi-metallic sheet from deformation during the manufacturing process that results in the heating of the bi-metallic sheet includes constraining the bi-metallic sheet with the mold used in the manufacturing process. In addition, the step of constraining the bi-metallic sheet from deformation during the step of cooling the bi-metallic sheet includes constraining the bi-metallic sheet with the mold and actively cooling the mold. As an example, actively cooling the mold includes circulating a thermal regulating fluid in contact with the mold.

In an alternate example method, the step of constraining the bi-metallic sheet from deformation during the step of cooling the bi-metallic sheet includes removing the bi-metallic sheet from the mold, placing the bi-metallic sheet in a separate constraining device, and allowing the bi-metallic sheet to cool while in the separate constraining apparatus. Optionally, the step of allowing the bi-metallic sheet to cool while in the constraining device includes actively cooling the constraining apparatus by, for example, circulating a thermal regulating fluid in contact with the constraining apparatus.

A constraining apparatus for constraining an item including a metal sheet is also disclosed. An example embodiment includes a first constraining component having a first thermally conductive contact surface adapted to abut a first surface of the metal sheet and a second constraining component having a second contact surface adapted to abut a second surface of the metal sheet. The second surface of the metal sheet is on an opposite side of the metal sheet as the first surface of the metal sheet. The example embodiment further includes an engaging device operative to fix the first constraining component and the second constraining component in position relative to one another, whereby the metal sheet is constrained between the first contact surface and the second contact surface. A thermal reservoir is coupled to accept heat energy from the metal sheet via the first thermally conductive contact surface of the first component. Optionally, the second contact surface of the second constraining component can be thermally conductive, and the thermal reservoir can be coupled to accept heat energy from the metal sheet via the second contact surface of the second constraining component.

Various means for constraining the metal sheet during a manufacturing process wherein the metal sheet is heated and cooled are disclosed.

In an example embodiment, the first constraining component is made of a thermally conductive material and, at least a portion of the thermal reservoir includes the thermal mass of the first constraining component. In addition, the first constraining component is made of metal, and the thermal reservoir includes an amount of metal having a thermal mass at least ten times larger than the thermal mass of the metal sheet. Optionally, the thermal reservoir includes a solid thermally conductive portion and a fluid passage thermally coupled to the solid thermally conductive portion.

The engaging device includes at least one clamp fixed to bias the first contact surface and the second contact surface against opposite sides of the metal sheet. The disclosed example embodiment includes a plurality of clamps disposed to apply substantially equal pressure over a majority of at least one of the first contact surface or the second contact surface. Also, in the example embodiment, one of the first contact surface and the second contact surface include a concave portion, and the other of the first contact surface and the second contact surface include a convex portion.

In an alternate example embodiment, the first constraining component and the second constraining component are parts of a mold, for example an injection mold.

BRIEF DESCRIPTION OF THE DRAWINGS

The present invention is described with reference to the following drawings, wherein like reference numbers denote substantially similar elements:

FIG. 8 is a perspective view of the cooling fixture of FIG. 7 with a removable top portion of the cooling fixture engaged with the base portion, clamping the component of FIG. 2 there between;

DETAILED DESCRIPTION

The present invention overcomes problems that occur when bimetallic parts are exposed to temperature fluctuations, by providing system and method for constraining parts as they are heated and/or cooled. Such heating and cooling of parts is common during a wide variety of manufacturing processes. Aspects of the invention are described with reference to a particular process, wherein plastic structural features are molded onto a bimetallic laptop display housing using an NMT process. However, it should be understood that the present invention can be used to prevent warpage of all types of parts in conjunction with other manufacturing processes (other than NMT) that cause susceptible parts to be heated and cooled. In addition, certain specific details (e.g., mold materials and temperatures) not necessary for an understanding of the present invention are omitted, so as not to unnecessarily complicate the explanation of the invention.

Figure 1:
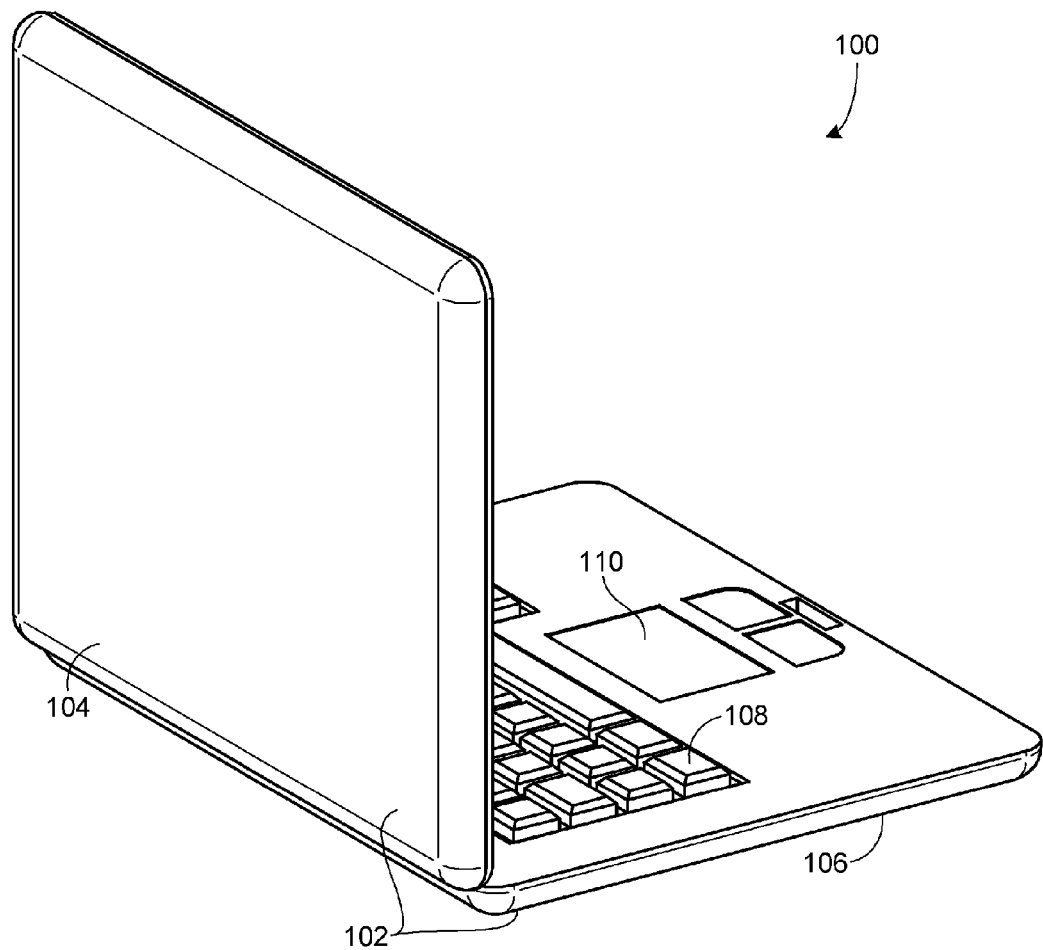
FIG. 1 shows a perspective view of an electronic device with a housing formed from bimetallic sheet material.

FIG. 1 shows an electronic device 100 that includes a metal housing 102. By way of example, electronic device 100 is a lap-top computer. However, it should be understood that the present invention is not limited to housings for lap-top computers. Rather, the present invention can be used in conjunction with any manufacturing process and/or part that is susceptible to warping.

Housing 102 includes a top shell 104 and a bottom shell 106 hinged in a clam shell relationship. Top shell 104 houses a computer display and speakers (not visible in FIG. 1), and bottom shell 106 houses a keyboard 108, a user input device 110, a computer board (not visible), and any other hardware components (not visible) that are desirable in lap-top computer 100.

Figure 2:
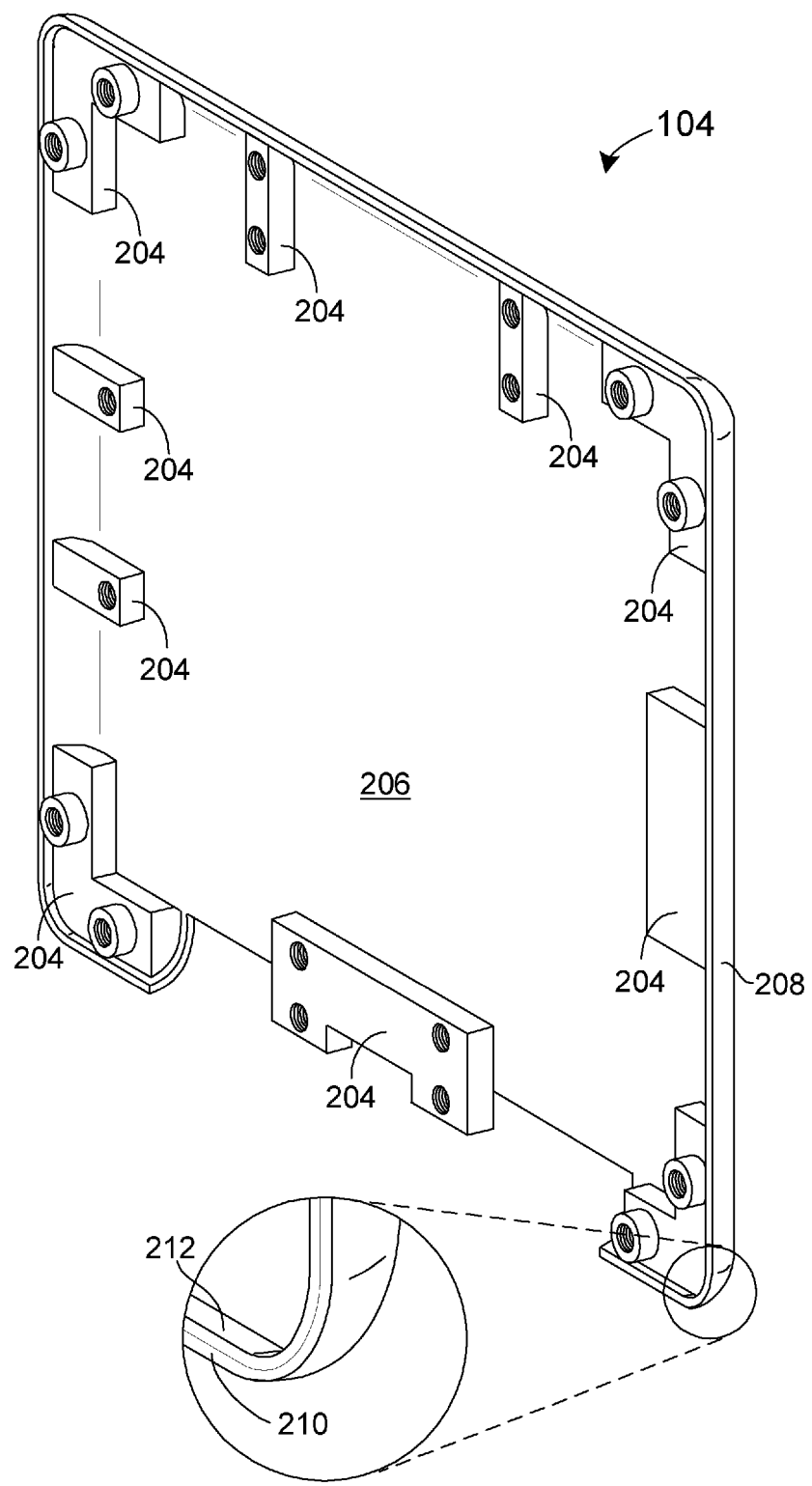
FIG. 2 is a perspective view of a component of the housing of FIG. 1 having molded structures formed thereon.

FIG. 2 is a perspective view of a top shell 104, which includes a plurality of molded mounting features 204 (e.g., screw bosses). Shell 104 includes an interior surface 206 and an opposite exterior surface 208. In addition, shell 104 is constructed from bimetallic metal (e.g., CLAD metal) having two distinct metal layers 210 and 212 bonded together by some suitable means (e.g., cold-rolling, metal deposition, etc.). Each of layers 210 and 212 is formed from a different type of metal such that surface 206 is formed of a first type of metal and surface 208 is formed of a second type of metal. The first type of metal (e.g., aluminum alloy) facilitates the bonding between shell 104 and mounting features 204, while the second type of metal (e.g., titanium, stainless steel, etc.) provides strength and rigidity to shell 104.

Although the present invention can be used with any type of sheet metal material, bimetallic sheet material is used as an example, because bimetallic sheet material is particularly susceptible to warping. In addition, bimetallic sheet material provides important advantages, both functional (e.g., as described in the previous paragraph) and aesthetic, in many applications. As used herein, the term "bimetallic sheet material" includes sheet material including two or more layers of different metal compositions.

Mounting features 204 facilitate the mounting of top shell 104 to, for example, the frame of the display (not shown) and/or bottom shell 106. Mounting features 204 are, for example, formed from plastic that is insert-molded directly on surface 106. A direct plastic-to-metal bond between the insert molded plastic mounting features 204 and surface 206 is achieved using NMT. Insert molding is just one example of manufacturing processes that can cause metal sheet material included in manufactured parts to be heated and cooled and can, therefore, result in the undesirable warping of the metal sheet material. The present invention can be used to facilitate many other such manufacturing processes that heat and cool the metal sheet material of parts.

Figure 3:
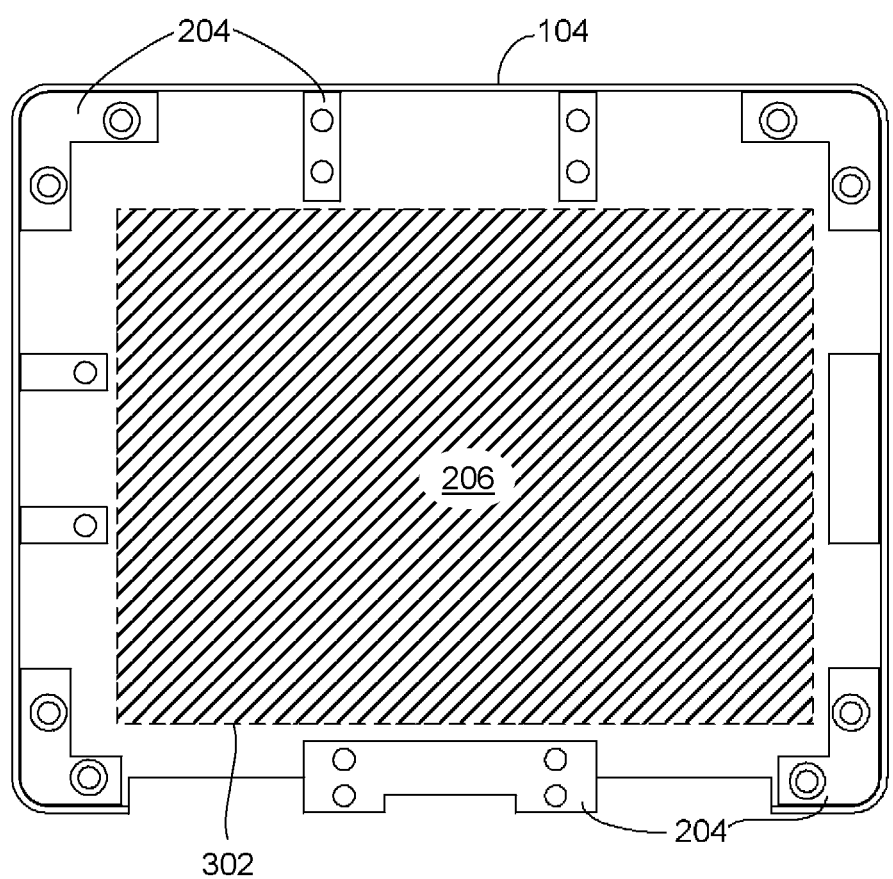
FIG. 3 shows a first surface area of the component of FIG. 2 that is held under constraint by a cooling fixture while the component is cooled.
Figure 4:
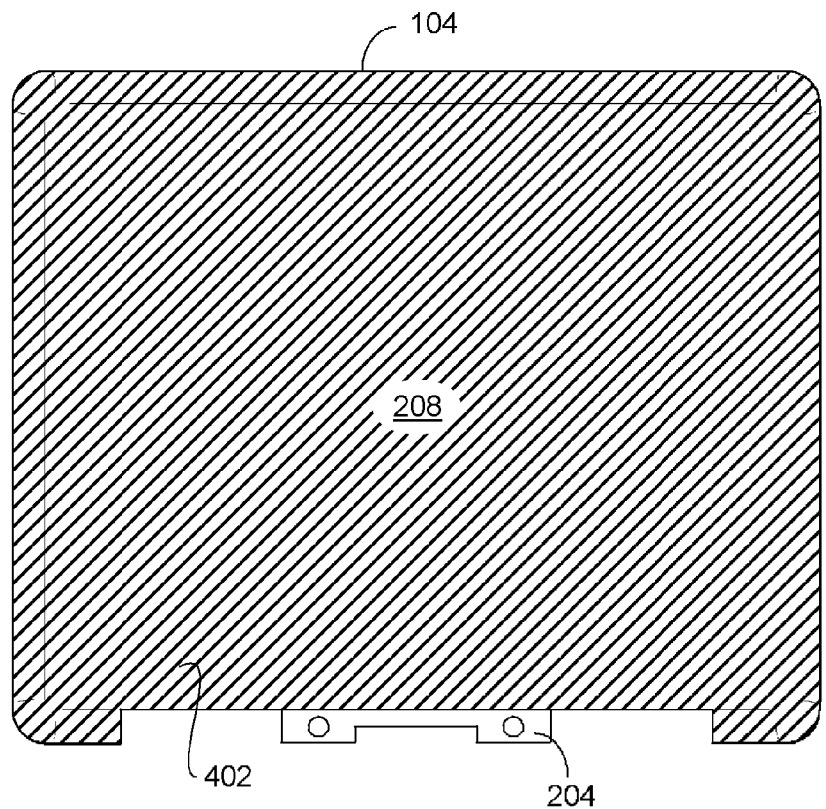
FIG. 4 shows an opposite surface area of the component of FIG. 2 that is held under constraint by a cooling fixture while the component is cooled.
Figure 5:
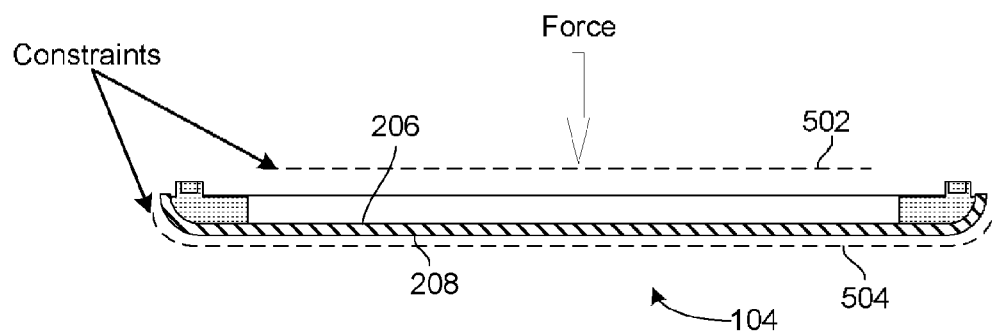
FIG. 5 is a representational diagram of the constraining forces applied to the component of FIG. 2 during heating and/or cooling of the component.

FIGS. 3, 4, and 5 illustrate the areas of shell 104 that are simultaneously held under constraint by a cooling fixture when shell 104 is cooled. FIG. 3 is a front plan view of shell 104. The shaded area 302 shows the area of interior surface 206 that is held under constraint by a cooling fixture.

FIG. 4 shows a rear plan view of exterior surface 208 of shell 104. The shaded area 402 shows the area of exterior surface 208 that is also held under constraint by a cooling fixture. In this particular embodiment, area 402 covers the entire, or at least the majority, of exterior surface 208 of shell 104.

FIG. 5 shows a representational cross-sectional view of shell 104. The dashed lines 502 and 504 represent the application of constraining forces applied to areas 206 and 208, respectively, by surfaces of a cooling fixture. The constraining forces on shell 104 are applied by surfaces of the cooling fixture in the direction shown. For clarity, dashed lines 204 are shown above surface 106 and dashed lines 206 are shown below surface 108. However, it should be understood that the forces represented by dashed lines 502 and 504 would be applied by directly abutting surfaces 206 and 208, respectively, with similarly contoured surfaces of the cooling fixture.

Figure 6:
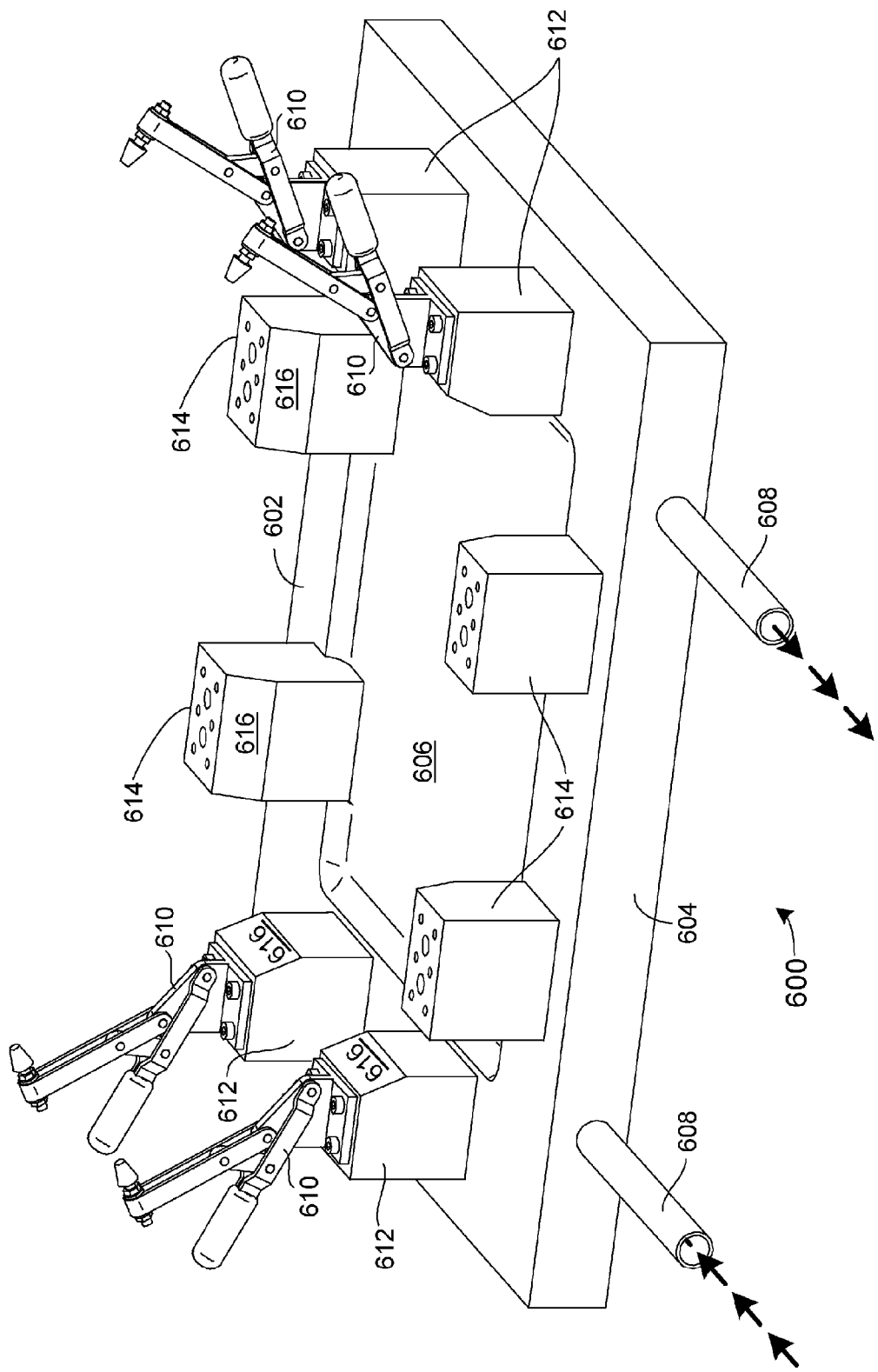
FIG. 6 is a perspective view of a base portion of cooling fixture.
Figure 7:
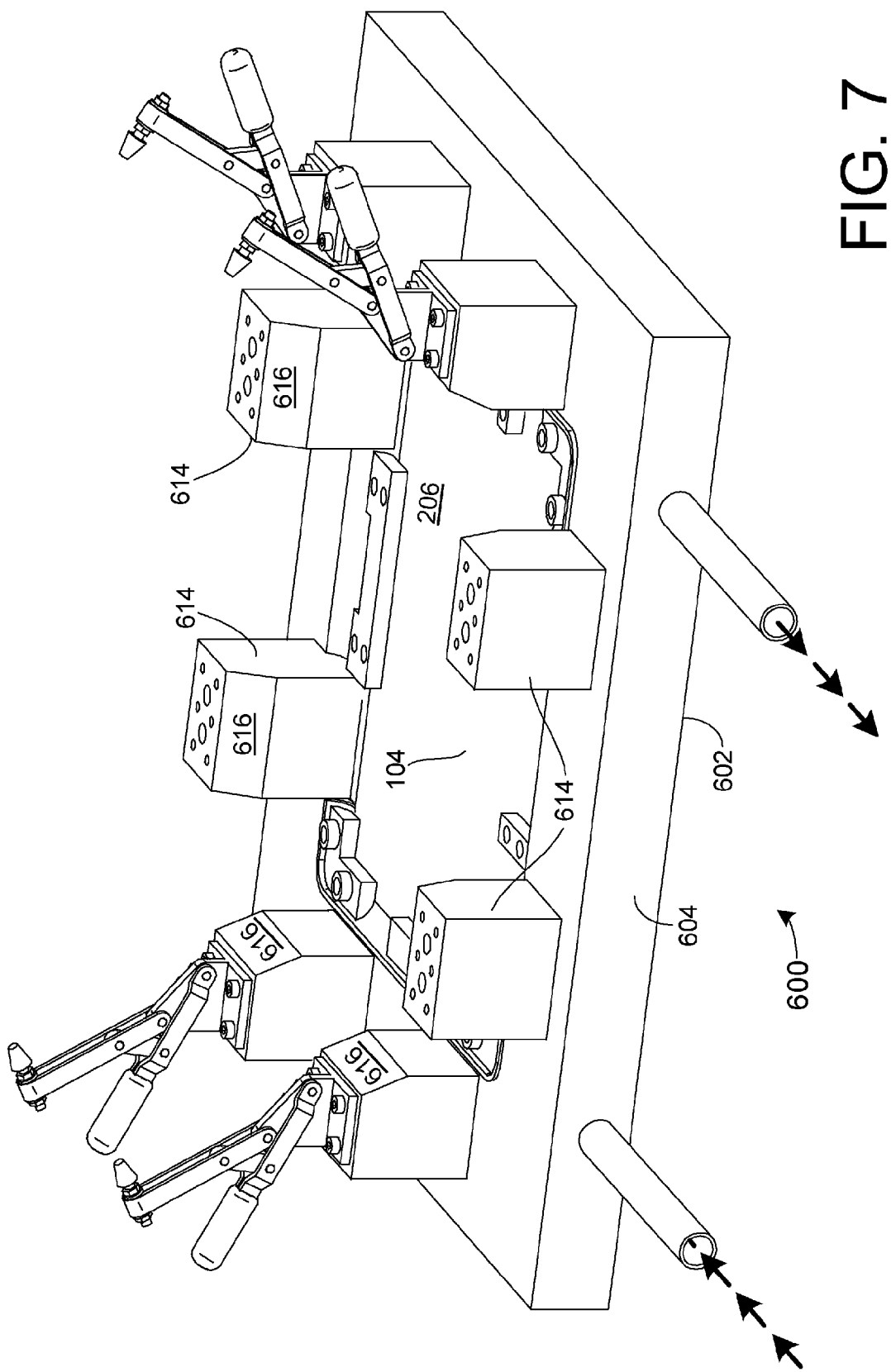
FIG. 7 is a perspective view of the base portion of the cooling fixture of FIG. 6 with the component of FIG. 2 seated therein.
Figure 8:
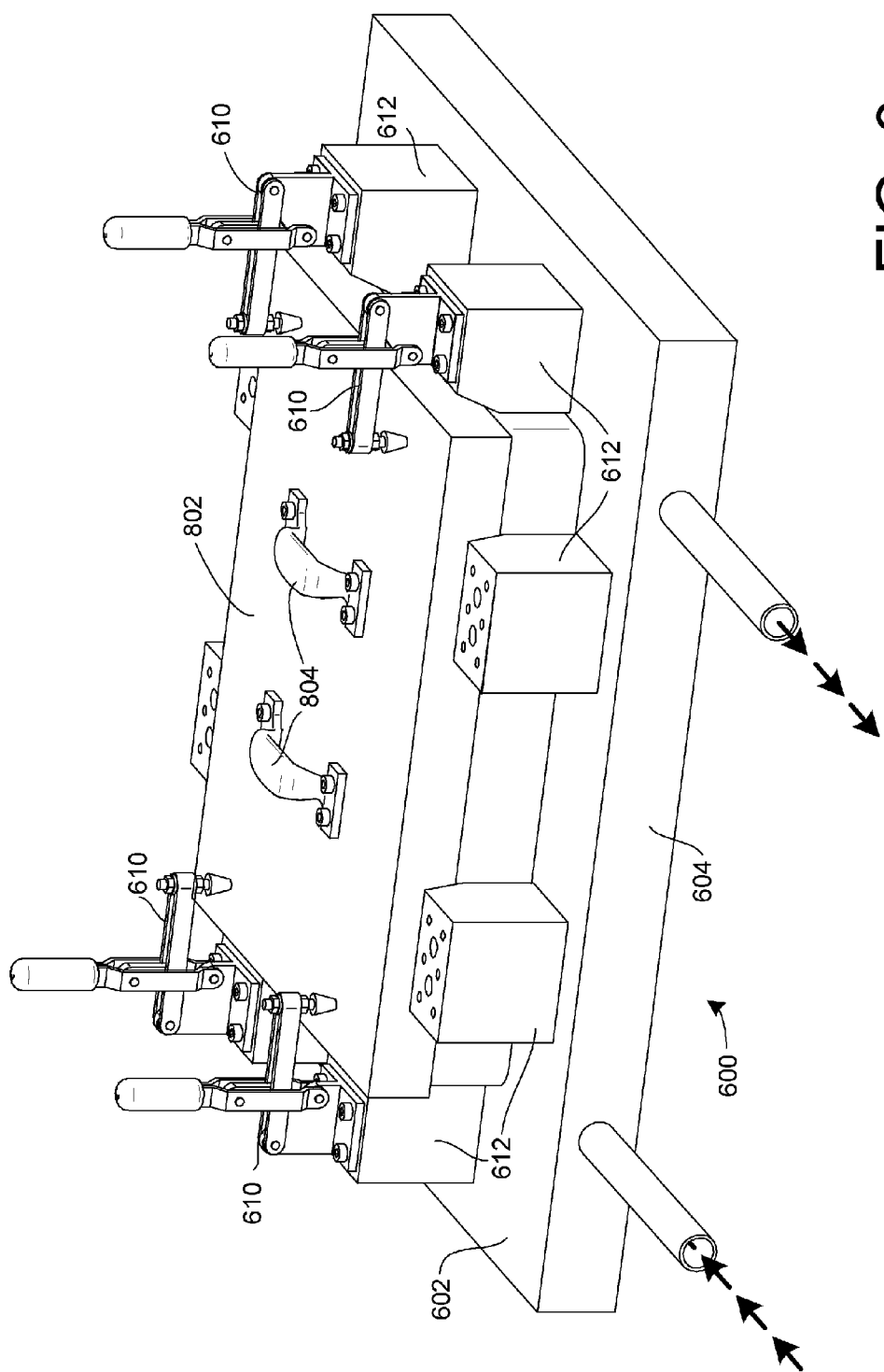

FIGS. 6, 7, and 8 show a cooling fixture 600 in various stages of use. FIG. 6 shows a base portion 602 of cooling fixture 600. Base portion 602 includes a thermal reservoir 604 and defines a recessed receiving surface 606 that is contoured to match surface 208 of shell 104. In this particular embodiment, surface 606 is generally flat in the center with concave peripheral border. The concave border is complementary to the convex edge of shell 104 and an optional convex surface of an upper portion of constraining apparatus 602 (not shown). Receiving surface 606 is thermally conductive and facilitates the flow of heat energy between shell 104 and thermal reservoir 604.

Thermal reservoir 604 includes a relatively large thermal mass (e.g., at least ten times greater) as compared to shell 104. In this particular embodiment, thermal reservoir 604 and surface 606 are formed from a block of thermally conductive metal, for example steel or aluminum. Thermal reservoir 604 includes conduits 608 that facilitate the circulation of a thermal regulating fluid through thermal reservoir 604. The circulated thermal regulating fluid facilitates the active heating and/or cooling of thermal reservoir 604 and, therefore, shell 104.

Base portion 602 is coupled to a plurality of engaging devices 610. In this example embodiment, engaging devices 610 are clamps that fix a removable portion of cooling fixture 600 (described below with reference to FIG. 8). Each of clamps 610 is fixed to base portion 602 of cooling fixture 600 via respective base portions 612. A plurality of edge constraining blocks 614 are also positioned adjacent the edge of receiving surface 606. Edge constraining blocks 614 restrain the edges of shell 104 during the cooling of shell 104. Each of base potions 612 and edge constraining blocks 614 include an inclined alignment surface 616 that, together, guide an upper portion of cooling fixture 600 into position, as will be described below.

FIG. 7 shows base portion 602 of cooling fixture 600 with shell 104 disposed therein, with inner surface 206 of shell 104 facing upward. The outer surface 208 (not visible in FIG. 7) of shell 104 rests on surface 606 (obscured from view by shell 104) of base portion 602. Edge restraining blocks 614 overhang the edge of shell 104 and abut both a top surface of base portion 602 and surface 206 of shell 104.

FIG. 8 shows cooling fixture 600 with an upper portion 802 disposed over shell 104 (not visible) and engaged with base portion 602. Upper portion 802 includes a pair of handles 804, which facilitate the insertion and removal of upper portion 802 Although not visible in the view of FIG. 8, the bottom of upper portion 802 includes a surface contoured to match the interior surface 206 of shell 104. Clamps 610 bias upper portion 802 toward base portion 602, constraining shell 104 there between. In addition, clamps 610 are arranged to maintain even pressure on shell 104 So constrained, shell 104 is held in an unwarped condition until shell 104 cools and the layers of shell 104 return to an unstressed stable state.

Figure 9:
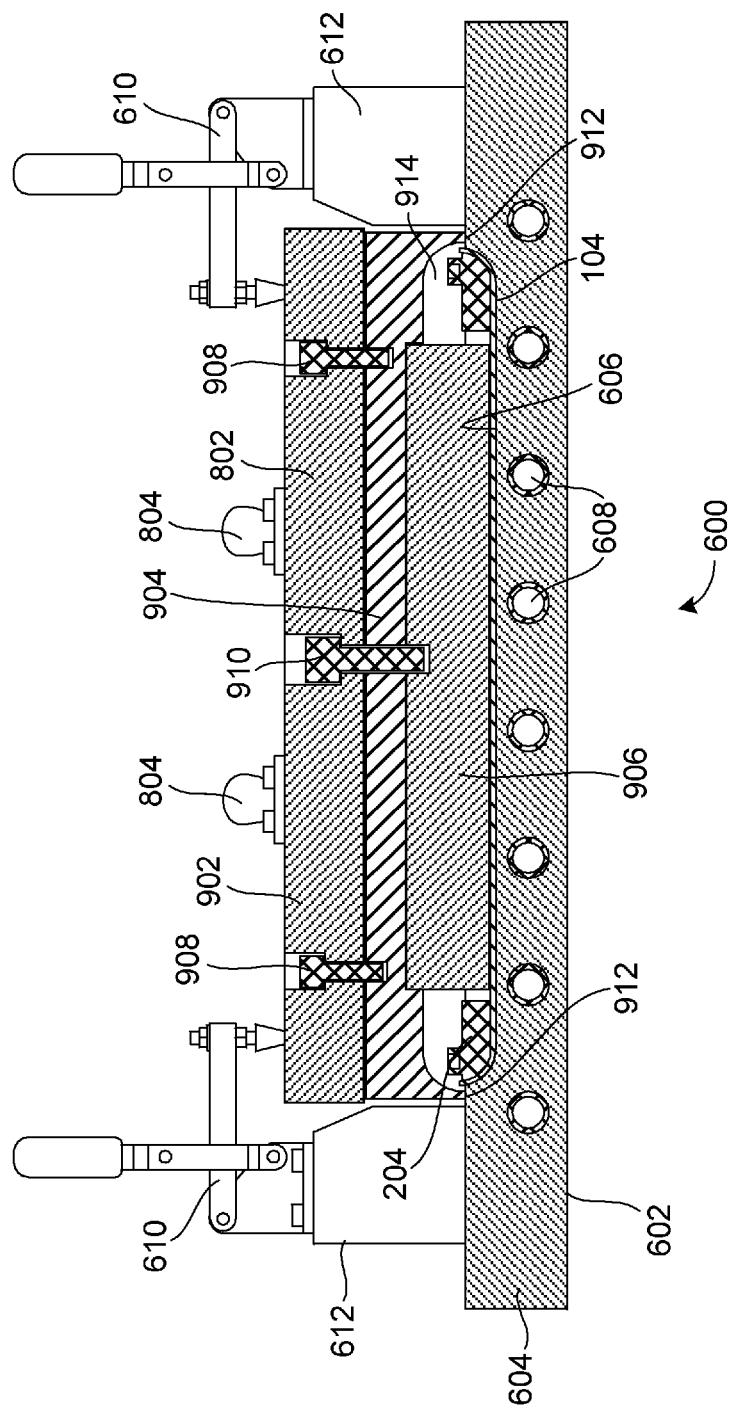
FIG. 9 is a side cross sectional view of the cooling fixture of FIG. 8 with the component of FIG. 2 clamped therein.

FIG. 9 is a side cross sectional view of cooling fixture 600 with shell 104 clamped therein. As shown in FIG. 9, upper portion 802 of cooling fixture 600 includes a top portion 902, an intermediate portion 904, and a contact portion 906. Top portion is fixed to intermediate portion 904 by a plurality of fasteners 908 (e.g., machine screws) and to contact portion 906 by one or more fasteners 910 (e.g., machine screws). Intermediate portion 904 includes a positioning surface 912 and defines a cavity 914. Positioning surface 912 contacts the upper surface of base portion 602 to ensure that excess pressure is not exerted on shell 104, which could result in the deformation of shell 104. Cavity 914 provides clearance for molded mounting features 204. Contact portion 906 abuts shell 104 in area 206 (shown in FIG. 3).

While constrained in cooling fixture 600, heat flows from shell 104, through thermally conductive surface 606 and into thermal reservoir 604. In this example embodiment, thermal reservoir 604 can be actively heated and/or cooled by circulating a thermal regulating fluid through conduits 608. However, thermal reservoir 604 can also be passive. For example, thermal reservoir 604 can be simply a thermally conductive object (e.g., a metal block) having a relatively large thermal mass with respect to shell 104 and/or sufficient surface area to dissipate heat into the ambient atmosphere.

Because shell 104 is thin, upper portion 802 can be thermally conductive or thermally insulating. Indeed, depending on the particular application, either embodiment can provide advantages. For example, in an actively cooled embodiment, a thermally insulating upper portion will direct most of the heat from shell 104 into thermal reservoir 604, where it can be carried away by the thermal regulating fluid in conduits 608. However, in a passively cooled constraining apparatus, it might be desirable to maximize the heat dissipation to the ambient atmosphere. In that case, it would be an advantage if upper portion 802 is thermally conductive.

After being cooled to a stable temperature, shell 104 can be removed from cooling fixture 600 without warping. Shell 104 is removed by releasing clamps 610 and lifting upper portion 802 from cooling fixture 600 by handles 804. Then, shell 104 can be removed from base portion 602 by any suitable means.

Figure 10:
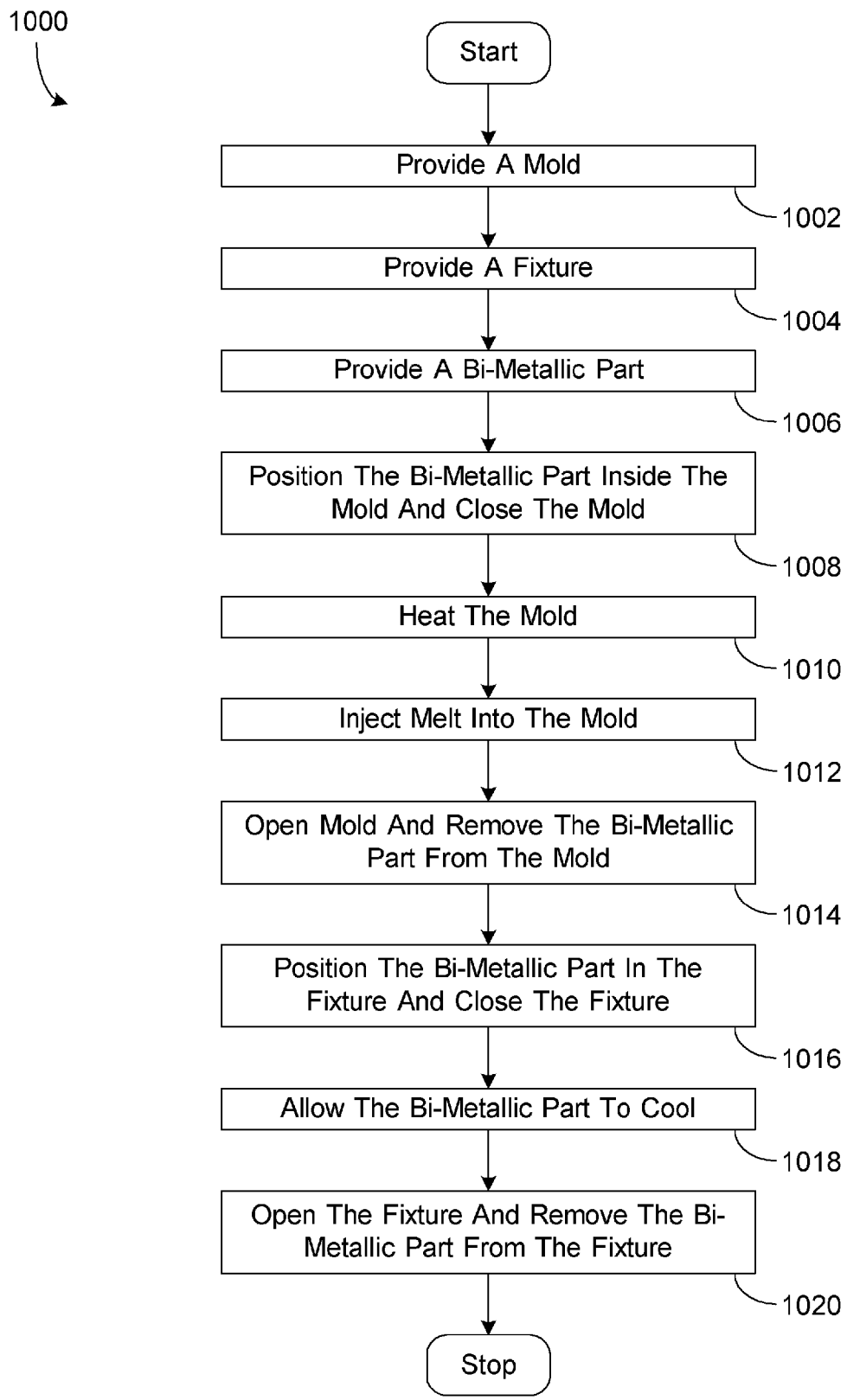
FIG. 10 is a flow chart summarizing an example method for reducing warpage of a bimetallic part during a manufacturing process according to one embodiment of the present invention.

FIG. 10 is a flow chart summarizing one method 1000 for reducing warpage during the manufacture of a part including metal sheet material. In a first step 1002, manufacturing equipment (e.g., a mold) is provided. Then, in a second step

1004, a cooling fixture is provided. Next, in a third step 1006, a part including metal sheet material (e.g., bimetallic sheet material) is provided. Then, the part is subjected to a manufacturing process. For example, in a fourth step 1008, the part is positioned in a mold. Then, in a fifth step 1010, the mold is heated. Next, in a sixth step 1012, melt material is injected into the mold. Then, in a seventh step 1014, the mold is opened, and the part is removed. Next, in an eighth step 1016, the part is placed in a cooling fixture. Then, in a ninth step 1018, the part is cooled to a stable temperature under physical constraint. Finally, in a tenth step 1020, the part is removed from the fixture, and the method ends.

Figure 11:
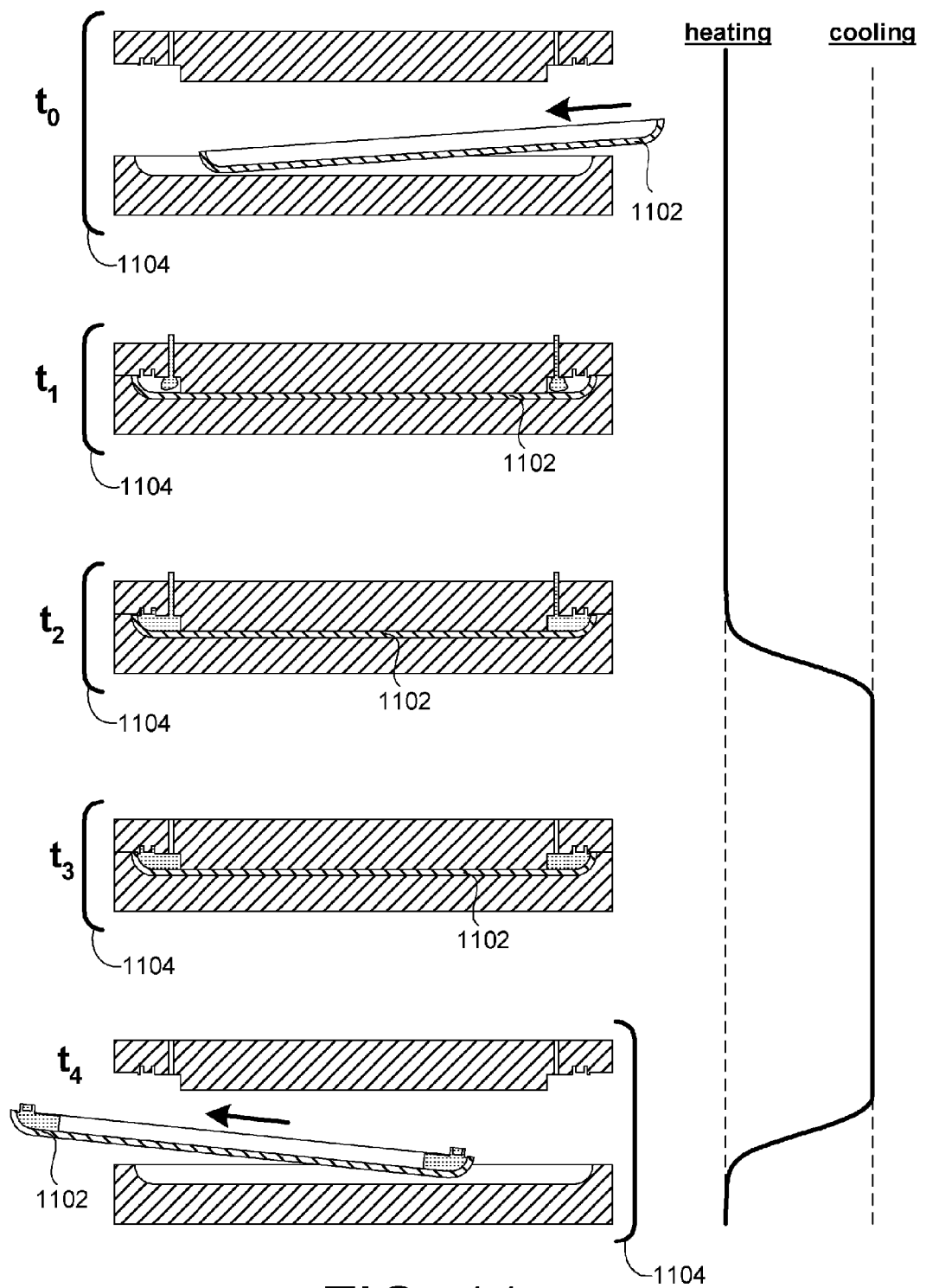
FIG. 11 shows a heating and cooling cycle for an injection mold according to a second embodiment of the present invention.

FIG. 11 shows a heating and cooling cycle for an injection mold according to a second embodiment of the present invention. In this embodiment, a manufacturing process that causes heating of a sheet metal component (e.g., bimetallic shell 104) is adapted to physically constrain the component during cooling of the component to a stable state. For example, the advantages of the invention can be obtained by adopting a rapid heating and cooling (RHCM) process for NMT molding on the bimetallic shell 104. In this process, at time $t_0$ the metal part 1102 will be loaded into the mold 1104 when the mold is at a lower temperature. This helps to prevent the metal part from initially warping since there will be no contact with a pre heated mold cavity. As shown in FIG. 11, heat is being applied to mold 1104 at $t_0$, but mold 1104 is still at a lower temperature from the previous cycle. Mold 1104 will begin to heat up and get to the desired temperature after it has been fully closed. Then, at time $t_1$, the injection of melt into mold 1104 begins. The mold remains at the desired high temperature until the melt is fully injected into the mold 1104. Then, at time $t_2$, cooling of the mold begins. At time $t_3$, the metal part 1102 remains physically constrained in closed mold 1104, until part 1102 is cooled down to a desired stable temperature. Then, at time $t_4$, mold 1104 is opened, part 1102 is removed, and heating of mold 1104 begins in preparation for the next mold cycle.

This alternate embodiment of the invention is a specific example of a broader aspect of the present invention. In particular, this alternate embodiment demonstrates that different types of manufacturing equipment for certain processes that result in the heating of parts can be modified to embody and utilize a cooling fixture according to the present invention. Thus, a separate cooling fixture is unnecessary in these instances.

Figure 12:
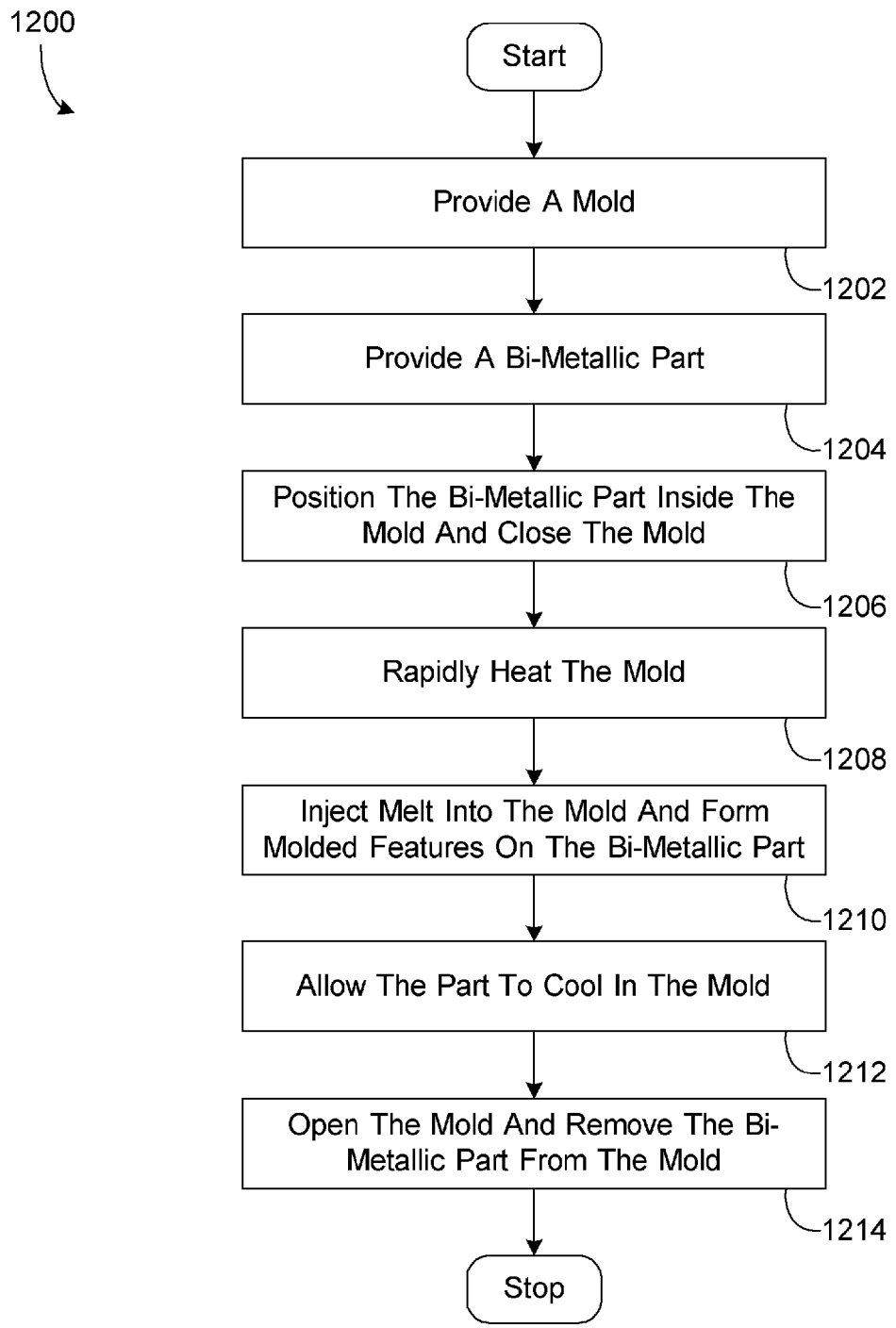
FIG. 12 is a flow chart summarizing an example method for reducing warpage of a bimetallic part according to a second embodiment of the present invention.

FIG. 12 is a flow chart summarizing an alternate example method 1200 for reducing warpage in a part incorporating metal sheet material (e.g., bimetallic sheet material) during a manufacturing process that results in the heating of the sheet material. In a first step 1202, manufacturing equipment embodying a cooling fixture (e.g., a modified mold) is provided and, in a second step 1204, a part including metal sheet material is provided. Then, in a third step 1206, the part is placed and constrained in the mold. Next, in a fourth step 1208, the mold is rapidly heated. Then, in a fifth step 1210, melt is injected into the mold to form molded features on the constrained part. Next, in a sixth step 1212, the part is cooled while being constrained in the mold. Finally, in a seventh step 1214, the cooled part is removed from the mold.

The description of particular embodiments of the present invention is now complete. Many of the described features may be substituted, altered or omitted without departing from the scope of the invention. For example, the cooling fixture of the present invention can be incorporated into manufacturing equipment/process (e.g., soldering, welding, cutting, etc.) other than molding processes. In addition, the present invention can be used with other types of parts and/or manufacturing processes that may be susceptible to warping problems. These and other deviations from the particular embodiments shown will be apparent to those skilled in the art, particularly in view of the foregoing disclosure.

We claim:

1. A method for manufacturing a component including a bi-metallic sheet, said bi-metallic sheet having a first layer of a first metal and a second layer of a second metal, said second metal being different than said first metal, said method comprising:
    performing a manufacturing process that results in the heating of said bi-metallic sheet;
    obtaining a fixture, wherein said fixture includes:
        a base portion including a recessed receiving surface;
        an upper portion including a contact portion and an intermediate portion; and
        a plurality of edge constraining blocks abutting edges of said recessed receiving surface, wherein each of said plurality of edge constraining blocks includes an inclined alignment surface;
    placing said component on said recessed receiving surface of said base portion of said fixture such that said plurality of edge constraining blocks retrain edges of said component;
    using said incline alignment surfaces of said plurality of edge constraining blocks to guide said upper portion of said fixture into position, thereby disposing said upper portion of said fixture over said component such that said contact portion of said upper portion of said fixture abuts an area of said bi-metallic sheet, and such that said intermediate portion of said upper portion of said fixture contacts an upper surface of said lower portion of said fixture;
    cooling said bi-metallic sheet; and
    physically constraining said bi-metallic sheet from deformation during said step of cooling said bi-metallic sheet until a temperature of the bi-metallic sheet is below a temperature of forming warpage when the bi-metallic sheet is placed at a room temperature, wherein said step of physically constraining said bi-metallic sheet comprises applying constraining forces to a first plurality of areas of said component but not to a second plurality of areas of said component.

2. The method of claim 1, further comprising physically constraining said bi-metallic sheet from deformation during said manufacturing process that results in the heating of said bi-metallic sheet.

3. The method of claim 2, wherein said step of performing a manufacturing process that results in the heating of said bi-metallic sheet includes performing a molding process.

4. The method of claim 3, wherein said molding process includes molding a structure directly on a surface of said bi-metallic sheet.

5. The method of claim 4, wherein said molding process is a Nano Mold Technology process.

6. The method of claim 4 wherein when said component is placed on said recessed receiving surface of said base portion of said fixture, substantially all of a bottom surface of said component directly couples the entirety of said received surface, and wherein said upper portion of said fixture disposed over said component creates a void area in said fixture, and wherein when said upper portion of said fixture is disposed over said component, said structure that is molded directly on said surface of said bi-metallic sheet is in said void area.

7. The method of claim 6, wherein said intermediate portion of said upper portion of said fixture contacts an upper surface of said lower portion of said fixture at edges of said recessed receiving surface that are adjacent to the edges that said plurality of edge constraining blocks abut.

8. The method of claim 3, wherein said step of constraining said bi-metallic sheet from deformation during said manufacturing process that results in the heating of said bi-metallic sheet includes constraining said bi-metallic sheet with a mold.

9. The method of claim 8, wherein the step of constraining said bi-metallic sheet from deformation during said step of cooling said bi-metallic sheet includes constraining said bi-metallic sheet with said mold.

10. The method of claim 9, wherein said step of constraining said bi-metallic sheet from deformation during said step of cooling said bi-metallic sheet includes actively cooling said mold.

11. The method of claim 10, wherein said actively cooling said mold includes circulating a thermal regulating fluid in contact with said mold.

12. The method of claim 8, wherein said step of constraining said bi-metallic sheet from deformation during said step of cooling said bi-metallic sheet includes:
removing said bi-metallic sheet from said mold;
placing said bi-metallic sheet in a separate constraining device; and
placing said bi-metallic sheet to cool while in said separate constraining apparatus.

13. The method of claim 12, wherein said step of placing said bi-metallic sheet to cool while in said constraining device includes actively cooling said constraining apparatus.

14. The method of claim 13, wherein actively cooling said constraining apparatus includes circulating a thermal regulating fluid in contact with said constraining apparatus.

15. The method of claim 1, wherein said step of physically constraining said bi-metallic sheet comprises biasing said upper portion towards said base portion.

16. The method of claim 15, wherein said lower portion further includes a thermal reservoir, and wherein said recessed receiving surface is thermally conductive and is configured to facilitate flow of heat between said bi-metallic sheet and said thermal reservoir.

17. The method of claim 16, wherein said thermal reservoir includes conduits, and wherein said step of cooling said bi-metallic sheet further includes circulating thermal regulating fluid through said conduits.

18. The method of claim 16, wherein said lower portion is a metal block having sufficient surface area to dissipate heat into the ambient atmosphere.

19. The method of claim 1, wherein said second plurality of areas circumscribes at least a portion of said first plurality of areas.

* * * * *